Figure 1:
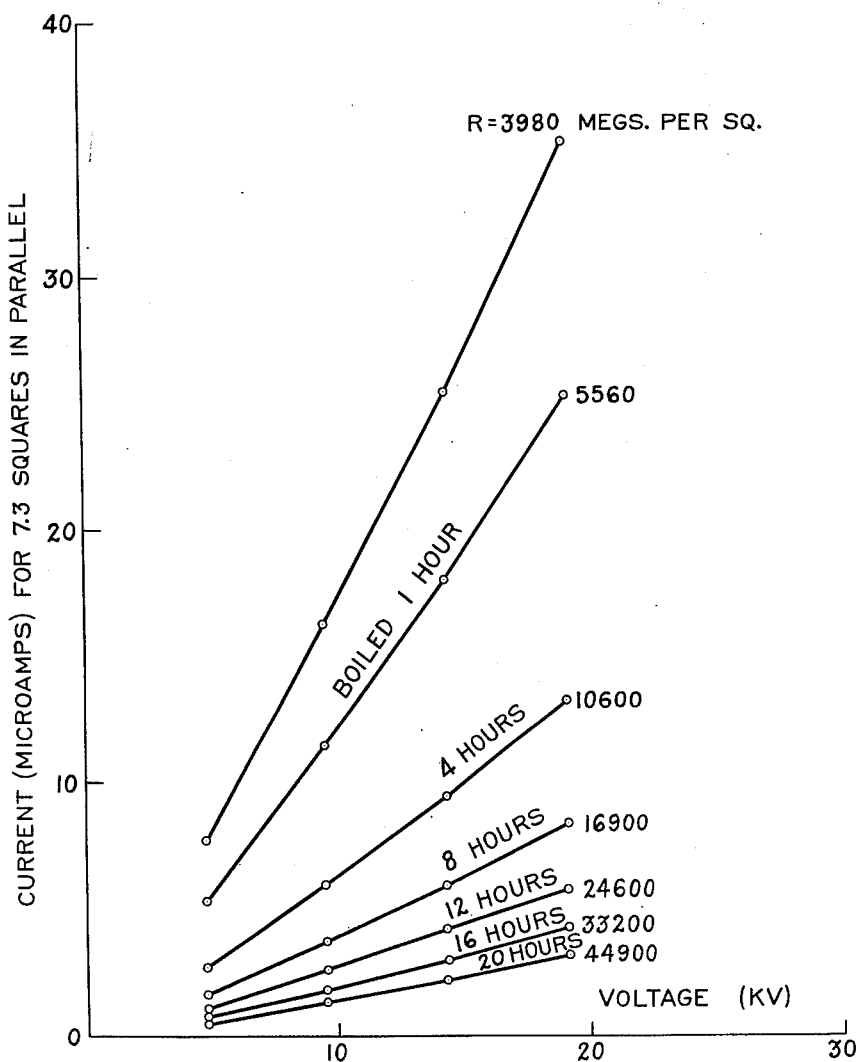

Inventor:
Katharine B. Blodgett,
by Paul A. Frank
Her Attorney.

Patented Apr. 28, 1953

2,636,832

UNITED STATES PATENT OFFICE 2,636,832

METHOD OF FORMING SEMICONDUCTING LAYERS ON GLASS AND ARTICLE FORMED THEREBY

Katharine B. Blodgett, Schenectady, N. Y., assignor to General Electric Company, a corporation of New York Application December 22, 1949, Serial No. 134,566

7 Claims. (Cl. 117—65)

1

The present invention relates to semi-conducting layers on glass surfaces. More particularly it relates to the preparation of stable high resistance semi-conducting layers on the surface of lead oxide glass.

In my copending application, Serial No. 84,466 filed March 30, 1949, now Patent No. 2,597,562, and assigned to the same assignee as the present invention, there is described and claimed a method of treating the surface of a lead oxide glass to produce thereon an electrically semiconducting surface layer. Briefly described that process comprises forming a thin surface film of silica on lead glass having a lead oxide content of at least 60 percent by weight and heating in a reducing atmosphere at an elevated temperature for a time sufficient at that temperature to reduce certain of the constituents of the glass surface to an electrically conducting or semiconducting state.

The coatings thus formed were found particularly useful when formed on the interior surface of an evacuated glass or glass-surfaced envelope such as on the interior of the glass envelope of an electron discharge device, e. g., the envelope of an X-ray tube. However, it has been found that many applications require resistances higher than those obtained by the above-described treatment. It has also been found that under certain conditions of humidity, the resistance of such films increased over a period of time at a rate somewhat proportional to the quantity of water vapor present in the atmosphere.

The present invention is based on the discovery that the resistances of semi-conducting layers obtained by heating lead glass in a reducing atmosphere can be increased and also stabilized by oxidation either by treating the layers with an oxidizing agent such as hot or boiling water or with hot or hot, damp air or other suitable oxidizing atmosphere.

The present invention is generally applicable to conducting films obtained by subjecting the surface of a lead glass to a reducing atmosphere at an elevated temperature. For best results, the conducting film or layer should be prepared by the method described in my above-mentioned copending application, Serial No. 84,466 which comprises the formation of a layer of silica on the lead glass surface prior to the reducing heat treatment.

As is pointed out in my copending application, a lead glass commonly used in X-ray apparatus for shielding purposes and referred to as "X-ray shield glass" possesses a composition which is

2 suitable for employing my invention. This glass ordinarily consists of about 61 percent lead oxide, 8 percent barium oxide and 31 percent silica by weight. Higher contents of lead oxide accompanied by correspondingly lower contents of silica may be advantageously employed for certain purposes but the lower limit of the lead oxide content is about 60 percent.

After selecting a suitable specimen of the shield glass, which may be of any size and shape according to the purpose for which it will be subsequently used, a thin film of silica is preferably formed on the surface thereof. One convenient way of obtaining this surface film comprises treating the specimen in a dilute solvent for lead oxide such as 0.01 HCl at a temperature of 25 to 60° C. In this manner, lead oxide may be leached out of the glass specimen to a depth which is determined by the strength and temperature of the acid and the length of time of treatment. The rate of leaching increases rapidly with solvent temperature and a film of approximately 1,000 A. U. thickness may be obtained in about three minutes when the solvent temperature is approximately 35° C.

After formation of the aforesaid silica film, the specimen is heated in a reducing gas such as hydrogen. Since the resulting silica film is not fused or melted to the surface of the specimen but rather may be considered as being "sintered," the hot hydrogen will readily penetrate the film and reduce the lead oxide in the specimen to form a surface layer beneath the silica film. Providing this treatment in hydrogen is carried out in a proper manner, the reduced layer will have a desired predictable high resistivity.

When the X-ray shield glass is heated in a reducing (hydrogen) atmosphere at any temperature of from about 330° to 500° C., the room temperature surface resistivity decreases from an initial, approximately infinite value fairly rapidly at first and then more slowly to approach a rather constant lower limiting value. When heated at 480° C., a lower limiting value of about $1.1 \times 10^5$ megohms per square is reached very quickly and this value will not vary appreciably with prolonged treatment. Some surface conductivity can also be obtained at 500° C. but at 520° C., no appreciable conductivity is noted. Constant temperatures as low as 330° C. require prolonged heat treating periods but in the end result in a lower resistivity than the more elevated temperatures approaching 500° C. When employing a constant single temperature, lowest limiting values of resistivity for X-ray glass are obtained when the heat treating temperatures are between about 370° C. and 400° C. and extend for a period of at least about 7 hours. The best conductivities have been obtained by a "two-temperature" treatment first at a low temperature region preferably 350° to 370° C. and then by raising the temperature slowly to a high value such as 500° or 520° C. This "two temperature" treatment may be advantageously employed to obtain thicker conducting layers having lower final values of resistivity, as well as to realize a substantial saving in time. I have found that in going from the low to the high temperature region a rate of 2° C./minute provides good results, although much slower rates or somewhat faster rates may be utilized.

The conducting layers formed upon specimens of shield glass in this manner are ordinarily about 100–200 A. U. in thickness. I have found such layers to be very stable under high voltage stresses and to exhibit ohmic characteristics. They have a linear current-voltage characteristic at gradients up to 100 kilovolts per inch, providing the resistivity is such as to keep the energy dissipation below about 0.3 watt per square inch. In order to form electrodes upon a specimen to provide a resistive element, each end may be dipped into about a 5 percent solution of polyvinyl acetate in acetone, such solution containing flake graphite. These electrodes are necessarily on top of the silica film which is relatively thin and porous and therefore has little or no electrical resistance.

It is not essential for imparting conductivity to the shield glass that the silica film shall be formed on the surface thereof as hereinbefore described. I prefer to utilize a silica film, because in this manner I am able to secure highly predictable results, and the results may be easily duplicated within narrow limits, providing the composition of the specimens remains substantially the same. Also, since the conducting layer is only 100–200 A. U. thick, it needs to be protected and the silica film provides protection. When a silica skin is utilized, the conducting layer developed by hydrogen treatment is situated immediately under the silica film. I have found that, if a specimen remains in air for some time, a very thin uneven film of silica is formed on its surface, presumably as a result of acidic vapors in the atmosphere. This film will not prevent the formation of my conductive layers, of course, but the resistivities obtained with this type of silica film will vary considerably from specimen to specimen. If a silica film is formed by the action of dilute hydrochloric or nitric acid, the resistivities obtained will be uniform. The silica layer may have a convenient thickness such as 50–5,000 A. U. I prefer to use a thickness of about 1,000 A. U. because such a thickness reflects an easily recognized blue interference color. A silica film which is formed by leaching lead oxide from the surface of the specimen in a suitable solvent will at first be soft, but after the specimen has been heated at from 400 to 500° C. in air or hydrogen, it will become very hard, thereby serving additionally as a protective agent for the conductive layer formed underneath.

In order to further assure uniform resistivities in my conductive layers, I have found that annealing the specimen to remove possible strains may be advantageous. Also, the lower limiting value of resistivity, which is obtained after hydrogen treatment, may be decreased somewhat if the surfaces of the specimens are ground with a wet carborundum wheel prior to the application of the silica film. Apparently, this increases the exposed surface area which the hydrogen may reach.

Also it is important that traces of foreign substances such as carborundum, copper, or copper salts, sodium salts, etc. be removed from the glass or be absent from the glass at the level at which the conducting layer is to be formed. Small traces of various foreign substances increase the resistivities to high values. One of the benefits obtained by treating the glass in dilute acid for the purpose of developing a silica film is that the acid commonly dissolves any foreign substance which has lodged in or been deposited on the surface of the glass. In the case of carborundum, which becomes lodged in the surface when the glass is ground and which is not soluble in acid, the glass can be cleaned prior to the acid treatment by being boiled in a 1 percent solution of caustic soda in water for about 5 minutes. The solution dissolves a thin layer of glass at the surface, thereby dislodging the carborundum.

A further benefit gained by employing a silica coating having a thickness at least 1000 A. U., is that the conducting layer then lies at a depth 1000 A. U. beneath any foreign substances on the surface, and receives no harmful effect from them.

For some purposes the physical properties of lead glass may not be well situated for the fabrication of devices upon which a surface modified by reduction is desired. In such cases, I apply a coating or coatings of lead glass upon a selected foundation and by subsequent reduction, secure a complete article having a high, stable surface resistivity.

As a first step, I comminute and finely powder the lead glass, for example, to about an 80-mesh size. Thereupon, I apply the finely divided glass as a thin coating on the surface of a foundation glass such as borosilicate glass, soda lime glass, lead glass with a lower lead oxide content, or a suitable ceramic material. The powdered glass is preferably applied by spraying employing a suspension of the powdered glass in a mixture of equal parts alcohol and water. I have found borosilicate glass to be particularly suited as a foundation material for use with high voltage electron discharge devices although other materials may be employed with suitable efficacy.

The powdered glass can also be applied to a foundation, or to the interior surface of a tubular member using a suspension of the powdered glass in a suitable liquid binder medium, e. g. a solution of nitrocellulose in amyl acetate or other vaporizable medium. This mixture may be applied as a thin coating on the surface of suitable specimen of borosilicate foundation glass as by flowing or dipping. A coating of about 0.5 mil thickness is satisfactory.

After the foundation glass has been thus coated, it is heated, preferably in air, for about a half hour at a temperature at which the coating will vitrify and form a tight bond with the underlying glass, 630° being a suitable temperature for the borosilicate glass. After the article has cooled, the powdered glass coat will have the appearance of a shiny glaze and cannot be loosened from the foundation glass by the test of applying gummed tape against the coating and pulling it off suddenly. Following the application and baking of the first coating, a second coating of the same powdered glass may be applied in identical fashion to the first. The baking of this second coating, however, must be conducted at a somewhat lower temperature, say approximately 570° C. when X-ray shield glass is used as coating material. This temperature is high enough to make the second coating adhere to the first but low enough to prevent the second coating from being substantially incorporated by fusion into the first.

Therefore, the second coating can be considered as being sintered. It has a mat appearance after cooling as contrasted with the glaze on the first coating. The thickness of the second coating preferably should also be about 0.5 mil. The thickness of each coat may be as much as 2 mils when the foundation is porcelain. Following the application and baking of the second coating, a silica film is formed thereon in the manner above described to insure predictable results.

To impart conductivity to the coated article so produced, it is baked in the presence of a reducing gas, such as hydrogen, at temperatures corresponding to those employed in connection with the X-ray shield glass described hereinbefore.

It is to be noted that the temperature at which the second coating is heated in air before the hydrogen treatment should not be much above 570° C. If this coating is heated at temperatures ranging from 600 to 630° C., the resulting resistivity after hydrogen treatment is not readily predictable. The limits of this temperature are therefore determined on the one hand by the fact that the second coating must adhere to the first and on the other hand by the fact that the predictability of the resistance must not be destroyed. In many cases, it is advantageous that the first coating should have substantially no conductivity after hydrogen treatment and, consequently, it is desirable to heat the first coating at as high a temperature as does not exceed the melting point of the underlying foundation. As will be explained hereinafter, the coating compositions may be varied within certain ranges, and in such event, the temperatures at which the coatings are baked may be advisedly varied to achieve the above purposes.

In the foregoing description I have mentioned several alternatives for the foundation material upon which coatings may be applied. The foundation material, of course, should have a substanitally infinite electronic resistance as well as a suitably high resistance to ionic conduction. I have found that the ceramic material, such as porcelain, may be advantageously employed as a foundation for my coatings. The coatings may be applied to porcelain in a manner similar to that described above in connection with borosilicate glass. It may be desirable, however, to heat the first coating in air at a temperature of about 670° C. rather than 630° C., in order to cause the coating to adhere more securely to the porcelain.

In making a resistive element from such coated articles, electrodes may be formed by painting a band of silver paint upon the first coating at both ends of the specimen. Thereafter, the second coating may be applied as hereinbefore described, and the conductive layer developed by hydrogen treatment. It is inadvisable to place the silver paint upon the second coating because the oil from the paint will be absorbed by the second coating and reduce the area upon which a conductive layer may be developed.

As is further stated in my copending application Serial No. 84,466, the lead glass base is not limited to the above-described X-ray glass. Glasses having a higher lead oxide content up to 85 percent by weight can also be employed and as the lead oxide content of the glass is increased, the minimum resistivity values will be decreased. If the lead content is below about 60 percent by weight, predictable resistivities cannot be obtained so that in general glasses of a lead content of 60 to 85 percent are preferred.

In general, the resistance of conducting X-ray shield glass immediately after hydrogen treatment is commonly less than 2000 megohms per square and depending on the nature of the glass surface may be as low as 500 megohms per square, the exact value depending on the way in which the hydrogen treatment was carried out. These are common values. They can be much higher than 2000 and somewhat lower than 500 depending on the hydrogen treatment.

Many applications require higher values of resistance, such as 10,000 to 50,000 megs per square. It has been found that the resistance of a sample can be increased to any value higher than that of the initial value by oxidation as by treating the sample in hot or boiling water or in hot air or hot, damp air. Such treatment properly applied also gives a resistance which will remain constant in the atmosphere over a long period of time. This feature is important in the case of plates used as resistors, coatings on transformer bushings, etc. It is believed that the increase is due to an oxidation of the semi-conducting lead which was developed by the reduction of lead oxide during the hydrogen treatment and which gives the surface layer its conductivity although the invention is of course not limited to or by this theory.

It has been found that the rate of increase obtained by treatment in hot water or hot air depends on the type of hydrogen treatment that had been used to develop the initial conductivity. The various hydrogen treatments produce different thicknesses of the conducting layer and this apparently explains the various rates. The conductivity can be destroyed quite readily near the surface of the glass by the oxidation treatment but the conductivity situated at greater depths is destroyed more slowly. It is believed that this is due to the diminished rate at which water vapor, for example, can penetrate to these depths.

When it is desired to prepare a conducting layer which will have the property that the resistance can be easily and controllably increased to any desired higher value which may be 10 or more times the initial value, the hydrogen treatment should be the "two temperature" treatment and the low temperature range in the neighborhood of 350° C. should be of short duration. A layer of X-ray shield glass on a porcelain surface which had been hydrogen treated by this method after the formation of a silica coating was boiled in water for successive intervals of time and the surface resistance thereof measured at the end of each interval. The results of a series of measurements made on the resultant coating are plotted in Fig. 1 of the accompanying drawing in which the current measured for 7.3 squares in parallel is plotted against the voltage. One hour boiling increased the resistance from 3980 to 5560 megohms per square. After 8 hours boiling the resistance was 16,900 megohms per square. At the end of 20 hours treatment in boiling water, the resistance had increased to 44,900 megohms per square. It was found that the rate of increase was practically constant for the first 8–10 hours and then increased gradually thereafter. This fact facilitates the preparation of a resistance layer having a predetermined resistance value.

When a sample is to be brought to a certain designated value of resistance, it has been found convenient to use plots of the rate of increase of resistance, rather than the rate of decrease of conductivity because the plots of resistance against time are nearly linear. The rate of increase can be determined from one or two measurements made near the start, and then the time required to reach the designated value can be estimated quite well. It is to be noted that the current-voltage plot is nearly linear at the start of the boiling water treatment and remains nearly constant to the end.

In the case of coatings made of powdered X-ray shield glass, the rate of increase in hot water is not the same as for X-ray shield glass plates, being usually considerably slower. Here again the rate depends on the depth to which conductivity has been developed under the surface, and this is influenced by the physical characteristics of the surface.

A variety of types of conducting layers can be developed, all from the same original untreated glass, these types having a wide range of rates of increase in boiling water. In general, when a sample has an initial high resistance, the rate of increase is rapid. In such cases, the rate of increase in boiling water is commonly 50 to 200 megs per square per minute. Apparently, the rate is rapid because the conducting layer has little depth. Conversely, when the initial resistance is low, the rate of increase is slow.

Figure 2:
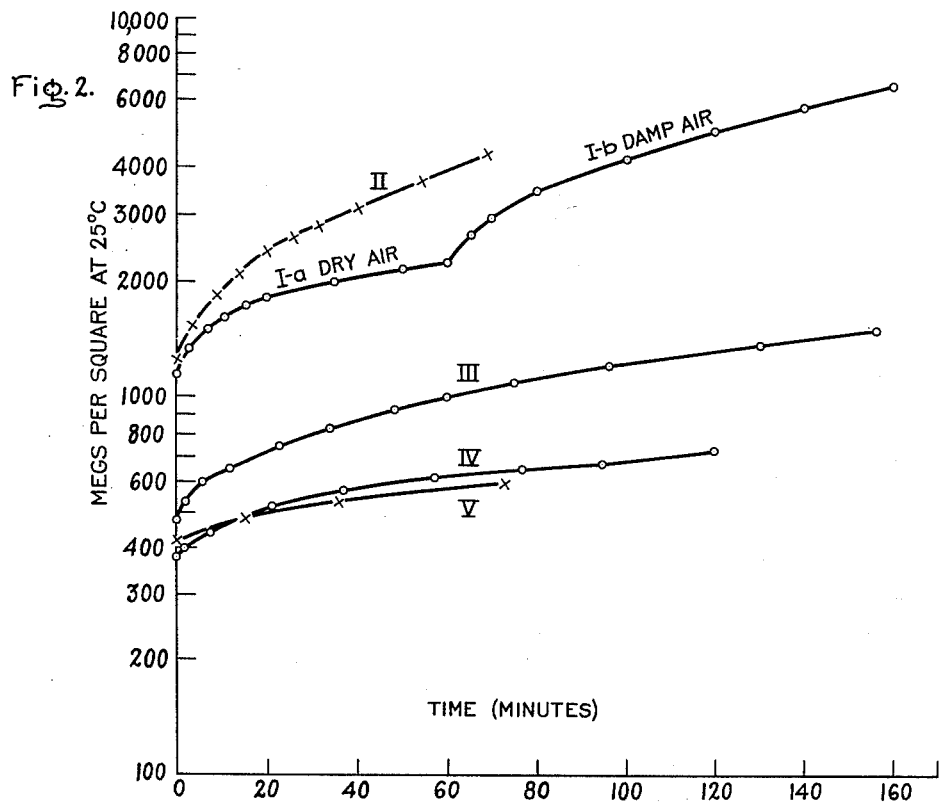
Figure 3:
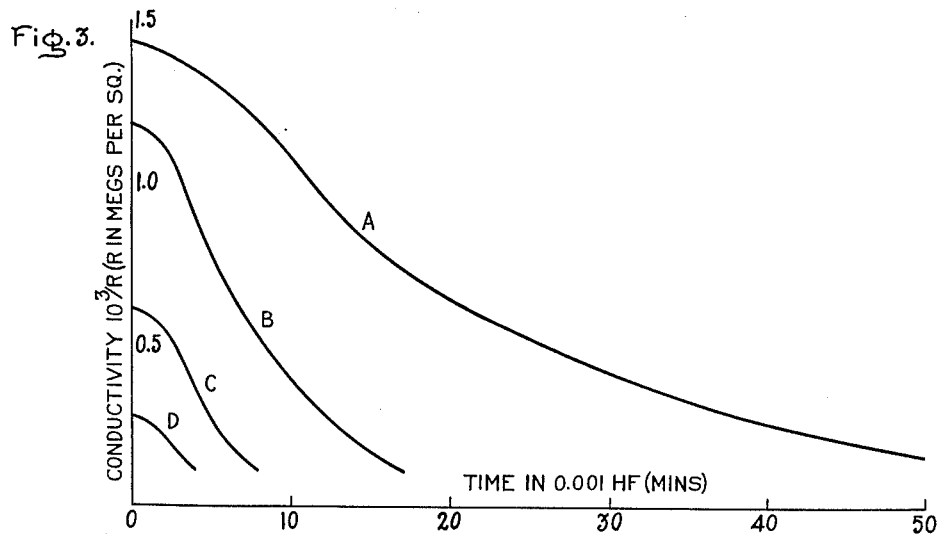

In the drawings, Fig. 1 is a graph of current vs. voltage for seven test samples; Fig. 2 is a graph of resistance vs. time for five samples; and Fig. 3 is graph of conductivity vs. time for four samples.

Experiments with hot air and hot, damp air have shown that similar increases in resistance are obtained and the results thereof are plotted in Fig. 2 in terms of resistance vs. time of treatment in air. The hydrogen treatment previously given the various samples of X-ray shield glass were as follows:

| Sample | Hydrogen Treatment |
| --- | --- |
| I | Slow heating 320° to 520° C. |
| II | Do. |
| III | 16 hrs. at 350° C., Slow heating to 520° C. |
| IV | 32 hrs. at 350° C., Slow heating to 520° C. |
| V | 16 hrs. at 350° C., Slow heating to 570° C. |

All of the measurements were made at 300° C. and except for the curve I-a were made in air bubbled through water at 25° C. Curve I-a was based on measurements made in dry air. A comparison of curves I-a and I-b shows that the rate of increase is greater in wet air than in dry air. The results on samples II, III and IV show that when the initial resistance is high, the rate of increase is greater than where the initial resistance is low.

The treatment given sample V is particularly useful when it is desired to prepare conducting glass so that the resistance will remain constant in the atmosphere. Two factors have been found to be important in this case. The first is that the conducting layer should have considerable thickness obtainable by longer heating in the lower temperature range, and the conductivity should be destroyed in the outer part of the layer, say to one-half its total depth. The conductivity very close to the surface is easily destroyed for any sample. It is this part of the conductivity that is most vulnerable when an unoxidized resistor is exposed to ordinary atmospheric temperature and humidity conditions. It will be noted that for each sample, the initial increase in resistance was large, i. e., within the first 10–30 minutes of treatment. In general, after some of the conductivity has been destroyed, it has been found that the deeper the residual conductivity lies in the glass, the greater is its stability in damp air. This is indicated by a comparison of samples III and IV. The rate of increase for example IV which received 32 hours at 350° C. was less than for sample III which received 16 hours. A proper comparison is made by comparing the rate of increase for each sample when the resistance is say twice the initial value. For sample III, the initial value was 480 megs per square, and it passed through 960 megs/sq. after 53 minutes in damp air. The initial value of sample IV was 375 megs/sq., reached 750 megs/sq. at 160 minutes. Since the conducting layer of sample IV which was held for a long time at the lower temperature had a greater thickness than that on sample III and the data of this paragraph show that when the residual conductivity was 50 percent of the initial value for each sample, the conductivity which lay at the greater depth had the slowest rate of increase in damp air. It is obvious that the resistors could be treated for a much longer time, until a time was found by trial that gave any needed degree of stability for the residual conductivity. This could be a rather small fraction of the initial conductivity.

A second factor which was found to be important in the problem of making resistors so that they will not change in the atmosphere was the thickness and presence of a silica coating.

All the conducting samples in the preceding table were provided with silica coatings, usually 1000 A. U. thick, which were developed on the glass before hydrogen treatment by a method which has been previously described. Silica coatings have the property that their hardness increases as the firing temperature is raised. The sample V which was heated to 570° C. for five minutes was found to be considerably more resistant to change in damp air than the samples heated to 520° C. It can, therefor, be concluded that hardening the silica at a high temperature makes it less permeable to water vapor. Since the temperature 570° C. is at the start of the softening range for X-ray shield glass, this temperature must not be maintained in hydrogen for any considerable length of time, for the pressure of the water vapor generated in the glass by the action of hydrogen on lead oxide raises the surface of the softened glass in blisters. However, the glass can be taken to 520° C. in hydrogen and then to 570° C. in dry nitrogen, and in this case no blisters are formed, and the conductivity is not impaired.

Silica coatings have been found to afford more effective protection against water vapor in the case of conducting X-ray shield glass than any other coatings that have been tried, such as plastics, etc. This is believed to be due to the fact that the silica coating is part of the glass and is, therefore, in intimate contact with the conducting layer that is situated immediately under the coating.

The stability of the treated products are shown by tests thereof in various relative humidities.

A series of tests were made on two plates treated by the method of sample V. In 0.30 R. H. (relative humidity) at 55° C. they showed no change of resistance after 7 days. In 0.25 R. H. at 70° C., no change after 7 days. In 0.65 R. H. at 55° C., there was a gradual slow change. In 1.0 R. H. at 55° C., the change was more rapid, the resistance increasing to twice its initial value in 7 days. In 1.0 R. H. at 70° C., the rate was still more rapid.

These data indicate the range of usefulness of samples treated by the method of sample V as there are many applications where a resistor is used under conditions where the R. H. would not exceed 0.3 R. H. at 55° C. as, for example, in apparatus immersed in transformer oil.

The manner in which the present invention can be carried into effect is best understood from a consideration of the thickness of various films or layers obtainable by the reducing treatment. Fig. 3 gives a measure of the thickness of four different conducting layers, which were prepared by four types of hydrogen treatment. The measurements were made by soaking the conducting sample in 0.001 hydrofluoric acid solution (1 part reagent HF in 1000 parts water) at room temperature and measuring the decrease of conductivity at regular intervals of one or two minutes. The hydrofluoric acid gradually dissolved the glass, thereby destroying the conducting layer. The graph shows the measured values of conductivity $10^3/R$ (R in megohms per square) plotted against time in minutes of HF treatment.

An estimate of the rate at which the glass was dissolved by 0.001 HF was made in the following way. As a first approximation, the glass was dissolved at about the same rate as silica. A thin silica film, having a thickness which reflected a purple color of the first order of interference, was prepared on the surface of a polished plate by treating the plate in dilute hydrochloric acid according to a method which has been previously described. The plate was treated in hydrogen at 520° C. for the purpose of hardening the silica by the high temperature firing, and of blackening the plate so as to raise the refractive index of the glass immediately under the silica, thereby increasing the brilliance of the interference color reflected by the silica film. The plate was then suspended in a 0.001 HF solution for 10 minutes, only one-half of the plate being under the surface of the solution. It was then rinsed in water and alcohol and dried. The half that was in the solution lost some of its thickness, and the interference color which it reflected changed by a corresponding amount from purple to orange. The amount of thickness which was lost was measured by building barium stearate monolayers on the orange area. It was found that four monolayers brought the color of this area to a purple which was an exact match for the original color, and six monolayers brought it to a blue which was definitely beyond this color. Barium stearate monolayers have a thickness 25 A. U. per layer. Therefore, the measurements show that silica which has been fired at 520° C. dissolves in 0.001 HF at 25° C. at a rate 100 A. U. in 10 minutes.

The four curves in Fig. 3 refer to samples which had been given the four following hydrogen treatments:

(A) 64 hrs. at 350° C. Up to 520° C. at a rate 2.0° C. per min.
(B) 16 hrs. at 350° C. Up to 520° C. at a rate 2.0° C. per min.
(C) 4 hrs. at 350° C. Up to 520° C. at a rate 2.0° C. per min.
(D) From 350° to 520° C. at a rate 2.0° C. per min.

The measurements were made with plates that had been polished with yellow rouge (Goldite) on wet billiard cloth on a revolving wheel. A very thin silica skin was developed on each plate before the hydrogen treatment by treating it in 0.01 H Cl at 25° C. for 15 seconds. The thickness of the skin was about 20 A. U. Experiments have shown that more reliable values of conductivity are obtained when a plate has a silica covering than when this is lacking, but only a very thin skin is needed.

With all four samples, the decrease of conductivity was slow during the first two minutes. This was the time required to dissolve the silica skin or film. The decrease then became more rapid and slowed down again at low values of conductivity. Lengths along the $x$-axis in Fig. 3 are proportional to distances from the surface of the glass toward the interior and may be converted to distances by putting 10 minutes in 0.001 HF equivalent to 100 A. U. This involves the assumption that the glass dissolves at the same rate as fired silica; the error involved in making this assumption is probably not large.

These results show that the thickness of the thin conducting layer formed by any type of hydrogen treatment can be measured and that the slope of one of these curves at any point on the curve is a measure of the specific conductivity at the depth in the glass corresponding to that point. This is, therefore, a measure of the distribution of conductivity as a function of depth.

Of course, the difference between the mechanism of the loss of conductivity in the HF experiments and in the oxidation experiments must be clearly understood. In the HF experiments, the outer layers of glass were progressively removed by being dissolved. In the hot water experiments, the glass was not dissolved, so the outer layers served to slow down or stop the diffusion of water vapor to the underlying layers which, until oxidized, retained their conductivity.

From the above description of the invention, it is seen that there have been provided means for preparing high resistance and stable conducting layers on lead glass surfaces. When the preparation of a high resistance layer is the principal object, the preferred process is to prepare a relatively thin conducting layer by the hydrogen treatment and thereafter oxidize a part of this layer as by treatment in boiling water. Employing such relatively thin layers, the resistance thereof can easily be increased by a large factor. When the principal object is the preparation of a conducting layer which will be stable at ordinary atmospheric humidities and temperatures the preferred practice is to form a relatively thick conducting layer during the hydrogen treatment and then to oxidize this layer to a substantial depth leaving a residual thinner conducting layer beneath the oxidized surface portion of the original layer. The results of the two modifications of the process differ of course only in degree since the stabilizing treatment increases the resistance of the treated layer while the treatment designed primarily to give a high resistance layer also imparts thereto some degree of stability. Both can be obtained by oxidation as in hot air but are preferably obtained by means of hot water or water vapor and the term "water" as used in the appended claims, unless further modified, is intended to cover both the liquid and vapor.

What I claim as new and desire to secure by Letters Patent of the United States is:

1. The method of imparting a high surface resistivity to lead glass which comprises heating a specimen of lead glass having a lead oxide content of 60 to 85 percent by weight in a reducing atmosphere first at a temperature between about 300° C. and 400° C. until a measurably conductive layer is produced upon the surface of said specimen and then raising the temperature above about 400° C. but not exceeding about 520° C. to impart further conductivity to said layer and thereafter increasing the resistivity of said layer by oxidizing said layer at an elevated temperature by contact with boiling water.

2. The method of imparting a high surface resistivity to lead glass which comprises heating a specimen of lead glass having a lead oxide content of 60 to 85 percent by weight in a reducing atmosphere first at a temperature between about 300° C. and 400° C. until a measurably conductive layer is produced upon the surface of said specimen and then raising the temperature above about 400° C. but not exceeding about 520° C. to impart further conductivity to said layer and thereafter increasing the resistivity of said layer by subjecting it to the action of boiling water.

3. The method of imparting a high surface resistivity to lead glass which is provided with a thin surface portion rich in silica and has a lead oxide content of 60 to 85 percent by weight, which comprises heating said specimen in a reducing atmosphere first at a temperature between about 300° C. and 400° C. until a measurably conductive layer is produced upon the surface of said specimen beneath said film and then at a temperature above about 400° C. but not exceeding about 520° C. to impart further conductivity to said layer and thereafter increasing the resistivity of said layer by heating said layer in contact with boiling water.

4. The method of imparting a high surface resistivity to lead glass which is provided with a thin surface portion rich in silica and has a lead oxide content of 60 to 85 percent by weight, which comprises heating said specimen in a reducing atmosphere first at a temperature between about 300° C. and 400° C. until a measurably conductive layer is produced upon the surface of said specimen beneath said film and then at a temperature above about 400° C. but not exceeding about 520° C. to impart further conductivity to said layer and thereafter increasing the resistivity of said layer by subjecting it to contact with boiling water.

5. An article of manufacture comprising an electrical semi-conductor comprising a glass base containing 60 to 85 percent lead oxide and a conductive surface portion bonded thereon consisting of a reduction product of lead glass which has an electric resistivity within the range of about 5560 to 44900 megohms per square.

6. An article of manufacture comprising an electrical semi-conductor comprising a glass base containing 60 to 85 percent lead oxide, a conductive surface portion thereon consisting of a lead reduction product having an electrical resistivity within the range of about 16900 to 44900 megohms per square and a film of sintered silica overlying said reduction product and bonded thereon, said film having a thickness in the range of 1000 A. U.

7. The step in the method of increasing the resistivity of a conductive layer of a reduction lead product formed on lead glass having a lead oxide content of at least 60 percent by weight which consists in heating said layer in contact with water at boiling temperature.

KATHARINE B. BLODGETT.

References Cited in the file of this patent

UNITED STATES PATENTS

| Number | Name | Date |
|---|---|---|
| 195,889 | Elbers | Oct. 9, 1877 |
| 1,633,534 | Long | June 21, 1927 |
| 2,025,099 | Gelstharp | Dec. 24, 1935 |
| 2,027,413 | Anderes | Jan. 14, 1936 |
| 2,220,862 | Blodgett | Nov. 5, 1940 |
| 2,233,622 | Lytle | Mar. 4, 1941 |
| 2,280,962 | McDougal | Apr. 28, 1942 |
| 2,314,804 | Willson | Mar. 23, 1943 |
| 2,319,816 | Land | May 25, 1943 |
| 2,339,928 | Hood | Jan. 25, 1944 |
| 2,432,484 | Moulton | Dec. 9, 1947 |
| 2,457,678 | Jira | Dec. 28, 1948 |